(12) United States Patent
Ehrlich

(10) Patent No.: US 6,199,939 B1
(45) Date of Patent: Mar. 13, 2001

(54) COMPOSITE JOINT CONFIGURATION

(75) Inventor: Rodney P. Ehrlich, Monticello, IN (US)

(73) Assignee: Wabash Technology Corporation, Arlington Heights, IL (US)

( * ) Notice: Subject to any disclaimer, the term of this patent is extended or adjusted under 35 U.S.C. 154(b) by 0 days.

(21) Appl. No.: 09/397,810

(22) Filed: Sep. 17, 1999

(51) Int. Cl.$^7$ ........................................ B60J 7/00
(52) U.S. Cl. .................. 296/181; 296/191; 296/185; 52/582.1
(58) Field of Search ....................... 296/181, 191, 296/183; 410/130, 132, 133, 139, 89, 152; 52/540, 543, 518, 582.1; 403/266, 267

(56) References Cited

U.S. PATENT DOCUMENTS

| | | | |
|---|---|---|---|
| 3,393,920 | * | 7/1968 | Ehrlich ................................ 296/181 |
| 4,266,385 | * | 5/1981 | Oehlert ................................ 52/543 |
| 4,685,721 | * | 8/1987 | Banerjea ............................. 296/181 |
| 4,703,948 | * | 11/1987 | Ehrlich ................................ 296/208 |
| 4,810,027 | * | 3/1989 | Ehrlich ................................ 296/181 |
| 4,856,236 | * | 8/1989 | Parker ................................ 52/518 |
| 4,940,279 | * | 7/1990 | Abott ................................ 296/181 |
| 4,958,472 | * | 9/1990 | Ehrlich ................................ 52/584 |
| 5,052,848 | * | 10/1991 | Nakamura ........................... 403/267 |
| 5,066,066 | * | 11/1991 | Yurgevich ........................... 296/181 |
| 5,112,099 | * | 5/1992 | Yurgevich ........................... 296/181 |
| 5,439,307 | * | 8/1995 | Steinhilber ......................... 403/267 |
| 5,664,826 | * | 9/1997 | Wilkens ............................. 296/181 |
| 5,860,693 | * | 1/1999 | Ehrlich ............................. 296/181 |
| 5,938,274 | * | 8/1999 | Ehrlich ............................. 296/181 |
| 5,992,117 | * | 11/1999 | Schmidt ............................ 296/181 |
| 5,997,076 | * | 11/1999 | Ehrlich ............................. 296/181 |
| 6,010,020 | * | 1/2000 | Abal ................................. 296/181 |

* cited by examiner

Primary Examiner—Carl D. Friedman
Assistant Examiner—Kevin McDermott
(74) Attorney, Agent, or Firm—Trexler, Bushnell, Giangiorgi, Blackstone & Marr, Ltd.

(57) ABSTRACT

A novel joint is provided between a pair of panels which are adapted for use in forming a sidewall of a trailer body and the like. First and second panels, each of which include an inner metal skin, an outer metal skin and a plastic core sandwiched therebetween, are joined together to form the joint. Each of the inner skin and the outer skin of the first panel have a first extending portion thereof which extends beyond an end of the core a predetermined distance. The first extending portions lay against each other and are bonded to each other. Each of the inner skin and said outer skin of the second panel have a second extending portion thereof which extends beyond the opposite end of the core a predetermined distance. The second extending portions lay against each other and are bonded to each other. Joining structure for joining the panels together along the first and second extending portions is provided. In a first embodiment, the joining structure includes a plastic or metal bar between the first and second extending portions. A plurality of rivets are provided through the first and second extending portions and the bar. In a second embodiment, the second extending portions sit against the first extending portions and a generally U-shaped metal member is mounted against the second extending portions. A plurality of rivets are provided through the first and second extending portions.

20 Claims, 2 Drawing Sheets

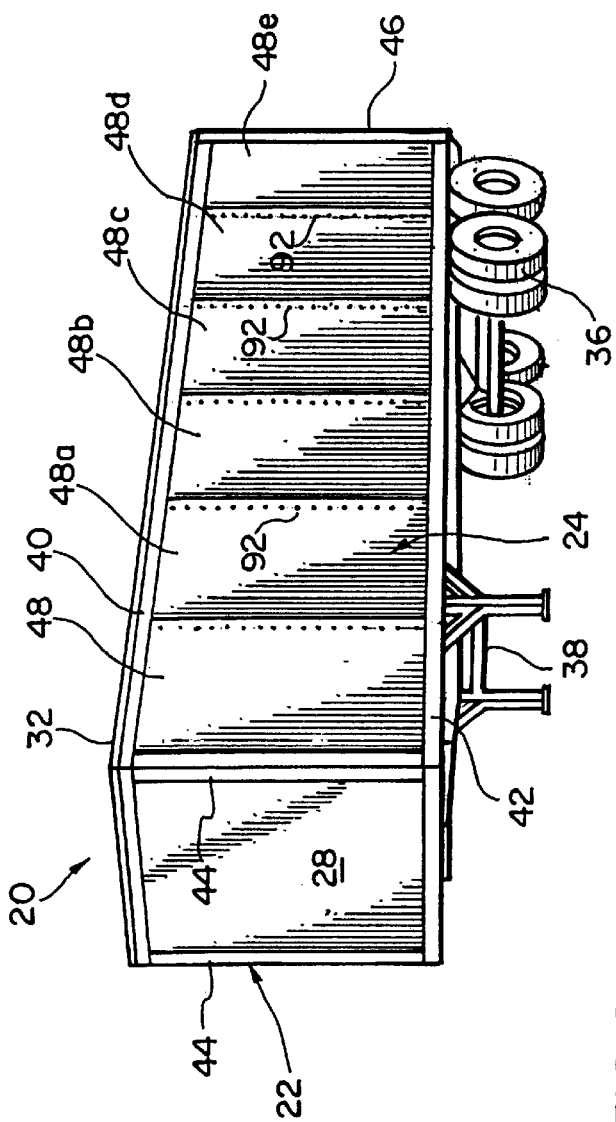
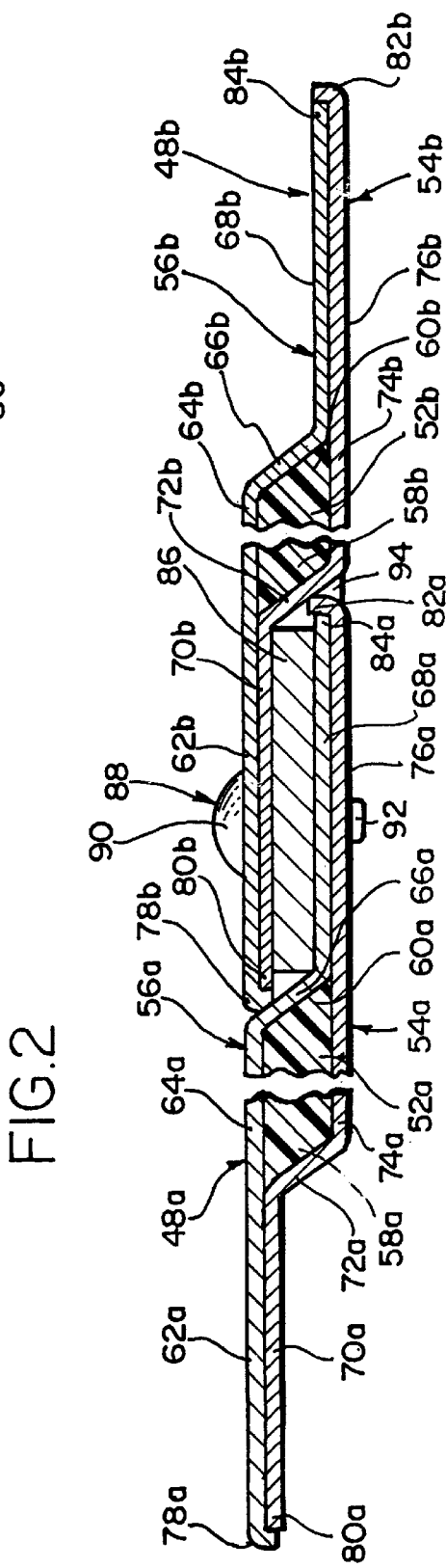

COMPOSITE JOINT CONFIGURATION

BACKGROUND OF THE INVENTION

This invention is generally directed to a novel sidewall for a trailer body. More particularly, the invention relates to joined composite panels for trailer bodies, wherein each composite panel includes a plastic core member sandwiched between thin metal skins and joined together by novel joints.

Trailers of the general type disclosed herein include a variety of types of sidewalls. A typical well-known construction is a panel-type trailer which includes aluminum side posts. Generally, it is desirable to have a relatively thin trailer sidewall so that the total inside dimensions of the trailer body can be increased to carry the optimum amount of cargo. In addition, it is desirable to have a trailer sidewall which is lightweight.

OBJECTS AND SUMMARY OF THE INVENTION

A general object of the present invention is to provide a novel joint configuration for joining a pair of composite panels together in a trailer sidewall, wherein a plurality of such joined panels may be used to form the trailer sidewall.

An object of the present invention is to provide a novel sidewall for use in a trailer body, which sidewall is strong, simple in design and economical to manufacture while at the same time providing maximum interior space in the trailer body.

Another object of the present invention is to provide a novel sidewall having a plurality of joined composite panels, wherein each composite panel includes a plastic core member sandwiched between thin metal skins.

These and other objects and features of the present invention will become more apparent from a reading of the following descriptions.

Briefly, and in accordance with the foregoing, the present invention discloses a novel joint between a pair of panels which are adapted for use in a sidewall of a trailer body and the like. First and second panels, each of which include an inner metal skin, an outer metal skin and a plastic core sandwiched therebetween, are joined together to form the joint. Each of the inner skin and the outer skin of the first panel have a first extending portion thereof which extends beyond an end of the core a predetermined distance. The first extending portions lay against each other and are bonded to each other. Each of the inner skin and said outer skin of the second panel have a second extending portion thereof which extends beyond the opposite end of the core a predetermined distance. The second extending portions lay against each other and are bonded to each other. Joining structure for joining the panels together along the first and second extending portions is provided. In a first embodiment, the joining structure includes a plastic or metal bar between the first and second extending portions. A plurality of rivets are provided through the first and second extending portions and the bar. In a second embodiment, the second extending portions sit against the first extending portions and a generally U-shaped metal member is mounted against the second extending portions. A plurality of rivets are provided through the first and second extending portions.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 1 is a perspective view of a trailer which incorporates the features of a first embodiment of the invention;

FIG. 2 is a cross-sectional view of a joint which incorporates the features of the first embodiment of the invention and is used to form a sidewall of the trailer shown in FIG. 1;

FIG. 3 is a perspective view of a trailer which incorporates the features of a second embodiment of the invention; and FIG. 4 is a cross-sectional view of a joint which incorporates the features of the second embodiment of the invention and is used to form a sidewall of the trailer shown in FIG. 3.

DETAILED DESCRIPTION OF THE ILLUSTRATED EMBODIMENT

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

Figures 3, 4:
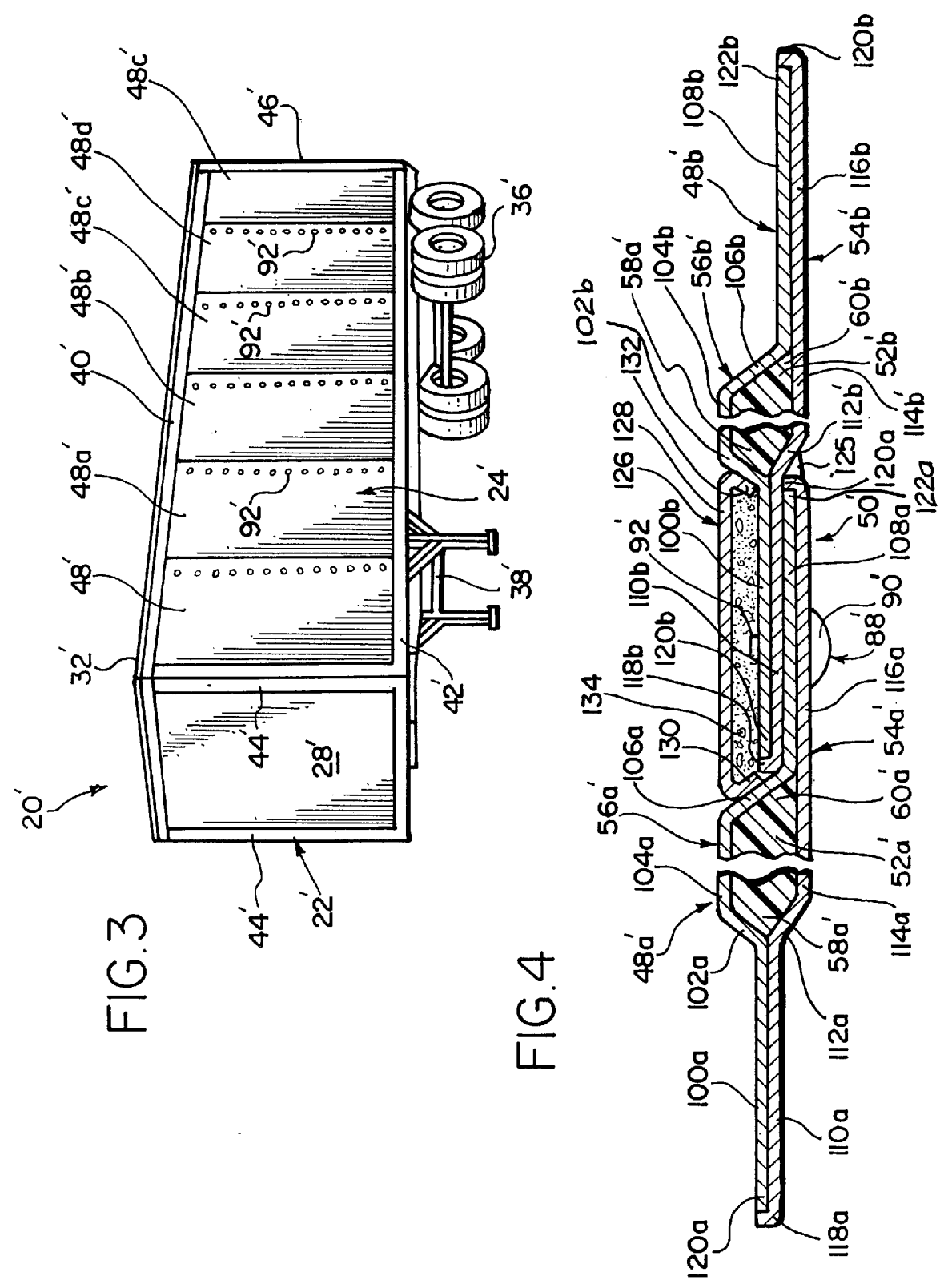

Turning now to the drawings, a first embodiment of trailer 20 constructed in accordance with the present invention is shown in FIG. 1 and a second embodiment of trailer 20' constructed in accordance with the present invention is shown in FIG. 3. In use, the trailer 20, 20' is connected to a tractor (not shown) by conventional means, such as a fifth wheel assembly. The trailer 20, 20' includes a body 22, 22' formed from a pair of opposite rectangular sidewalls 24, 24', a front wall 28, 28', rear doors, a top panel or roof 32, 32' and a floor. The floor is supported by a conventional rear undercarriage assembly 36, 36' and has a landing gear 38, 38' secured thereunder at a forward position. The top panel 32, 32' and an upper portion of the sidewalls 24, 24' are secured to a top rail 40, 40', and the floor and a lower portion of the sidewalls 24, 24' are secured to a bottom rail 42, 42'. A respective L-shaped extrusion 44, 44' joins the front end of each sidewall 24, 24' to the front wall 28, 28' and a respective L-shaped extrusion 46, 46' joins the rear end of each sidewall 24, 24' to the hinges which connect the doors to the body 22, 22'.

Each sidewall 24, 24' includes a plurality of vertical upstanding composite panels 48–48e; 48'–48e'. End of adjacent panels, for example, 48a and 48b; 48a' and 48b' are used in forming the novel joint 50, 50' of the present invention. A first embodiment of the joint 50 is shown in FIG. 2 and is used to form the trailer 20 as shown in FIG. 1. A second embodiment of the joint 50' is shown in FIG. 4 and is used to form the trailer 20' as shown in FIG. 3. At least two panels are joined together by the novel joint 50, 50' to form the sidewalls 24, 24' of the trailer body 22, 22'. Typically, each panel 48–48e; 48'–48e' is four feet in width, but can be longer or shorter depending on the application.

Attention is now directing to the first embodiment of the novel joint 50 shown in FIG. 2 which is used to form the trailer 20 shown in FIG. 1. For convenience in the explanation of the joint 50, the joint 50 is only shown between panels 48a and 48b and is described with respect thereto. It is to be understood that like joints 50 are provided between adjacent panels, 48 and 48a; 48b and 48c; 48c and 48d; 48d and 48e, to form each complete sidewall 24 as one of ordinary skill in the art would understand. Moreover, for convenience in explanation, the structure of the panels 48–48e is described with respect to panel 48a, with the understanding that the structure of each of the other panels 48, 48b–48e is identical in construction.

Panel 48a includes a plastic core member 52a sandwiched between an outer thin metal skin 54a and an inner thin metal skin 56a and bonded thereto by a suitable known adhesive or other like means. The outer skin 54a and the inner skin 56a are preferably approximately 0.026 inches thick. The skins 54a, 56a are preferably made of aluminum, galvanized, full hardened steel, such as AISI Grade E full hard steel because of its cost effectiveness, or the like. Preferably, the outer skin 54a is made of ASTM G90 galvanized steel and the inner skin 56a is made of ASTM G60 galvanized steel. Aluminum may be used, but it may be too soft for some purposes and strength and punch resistance are sacrificed, however, aluminum is lightweight. Each core member 52a is made of some type of compressible non-metal material, preferably thermoplastic, such as polypropylene or high density polyethylene. These materials are relatively inexpensive as compared to aluminum found in prior trailer wall constructions. In addition, because a composite panel 48a is used, the weight of the trailer construction is reduced over trailers having aluminum sidewalls.

The core member 52a has a first end 58a which slants from the interior of the trailer 20 to the exterior of the trailer 20 at an angle. A second end 60a of the core member 52a also slants from the interior of the trailer 20 to the exterior of the trailer 20 at an angle. The second end 60a may slant at the same angle as the first end 58a of the core member 52a as shown in FIG. 2.

The inner skin 56a of the panel 48a has a plurality of portions which are integrally formed with each other and are roll formed into shape. Specifically, working left to right in FIG. 2, the inner skin 56a includes a first extending portion 62a which is connected to and integrally formed with an intermediate side portion 64a which is connected to and integrally formed with an intermediate end portion 66a which is connected to and integrally formed with a second extending portion 68a. The intermediate side portion 64a abuts against and covers the side of the core member 52a, and the intermediate end portion 66a abuts against and covers the second end 60a of the core member 52a. Thus, the intermediate end portion 66a is angled relative to the intermediate side portion 64a. The first extending portion 62a extends outwardly from the first end 58a of the core member 52a a predetermined distance, preferably approximately one inch, and is flush with the intermediate side portion 64a. The second extending portion 68a extends outwardly from the second end 60a of the core member 52a a predetermined distance, preferably approximately one inch, and is parallel to the intermediate side portion 64a and is angled relative to the intermediate end portion 66a.

The outer skin 54a of the panel 48a has a plurality of portions which are integrally formed with each other and are roll formed into shape. Specifically, working left to right in FIG. 2, the outer skin 54a includes a first extending portion 70a which is connected to and integrally formed with an intermediate end portion 72a which is connected to and integrally formed with an intermediate side portion 74a which is connected to and integrally formed with a second extending portion 76a. The intermediate side portion 76a abuts against and covers the side of the core member 52a, and the intermediate end portion 72a abuts against and covers the first end 58a of the core member 52a. Thus, the intermediate end portion 72a is angled relative to the intermediate side portion 76a. The first extending portion 70a extends outwardly from the first end 58a of the core member 52a a predetermined distance, preferably approximately one inch, and is parallel to the intermediate side portion 76a and is angled relative to the intermediate end portion 72a. The second extending portion 76a extends outwardly from the second end 60a of the core member 52a a predetermined distance, preferably approximately one inch, and is flush with the intermediate side portion 76a.

The first extending portions 62a, 70a abut against each other along the length thereof. The first extending portion 62a of the inner skin 56a is slightly longer than the first extending portion 70a of the outer skin 54a and the end 78a of the first extending portion 62a is bent, by roll forming, around the end 80a of the first extending portion 70a to form a first radiused end 78a. The first extending portions 62a, 70a are preferably bonded together by suitable means, such as adhesive.

The second extending portions 68a, 76a abut against each other along the length thereof. The second extending portion 76a of the outer skin 54a is slightly longer than the second extending portion 68a of the inner skin 56a and the end 82a of the second extending portion 76a is bent, by roll forming, around the end 84a of the second extending portion 68a to form a second radiused end 82a. The second extending portions 68a, 76a are preferably bonded together by suitable means, such as adhesive.

To form the novel joint 50, a member 86, in the shape of a bar, is provided between and abuts against the first extending portion 70b of panel 48b and the second extending portion 68a of panel 48a. A plurality of rivets 88 are provided through the first extending portions 62b, 70b of panel 48b, through the member 86, and through the second extending portions 68a, 76a of panel 48a. A plurality of aligned apertures are provided through first extending portions 62b, 70b, the member 86, and the second extending portions 68a, 76a to accommodate the rivets 88. Otherwise, the member 86 is solid and extends the generally the entire height of the panels 48a, 48b. The member 86 is made out of suitable material, and preferably metal or plastic. The head 90 of each rivet 88 abuts against the first extending portion 62b of panel 48b. The end of the shank of each rivet 88 is upset and the resulting bloom 92 abuts against the second extending portion 76a of panel 48a. By providing the doubled first extending portions 62b, 70b on the interior of the sidewall 24 and on the doubled second extending portions 68a, 76a on the exterior of the sidewall 24, reinforcement is provided to the joint 50.

The second radiused end 82a of panel 48a abuts against the intermediate end portion 72b of panel 48b such that a flush outer surface is provided along the length of second extending portion 76b, intermediate side portion 74a, second extending portion 76a and intermediate side portion 74a. A generally V-shaped juncture results between second radiused end 82a and intermediate end portion 72b. A sealant 94 is provided along the length of the V-shaped juncture to prevent the entry of moisture into the interior of the trailer 20. The first radiused end 78b of panel 48b abuts against the intermediate end portion 66a of panel 48a such that a flush inner surface is provided along the length of first extending portion 62a, intermediate side portion 64a, first extending portion 62b and intermediate side portion 64b. The radiused ends 78a, 78b; 82a, 82b provide for a smooth surface on the respective interior surface and the exterior surface of the trailer 20 to deter an outside object, such as a forklift, from snagging the sidewalls 24.

Attention is now directed to the second embodiment of the novel joint configuration shown in FIG. 4 which is used to form the trailer 20' shown in FIG. 3. For convenience in the explanation of the joint 50', the joint 50' is only shown between panels 48a' and 48b' and is described with respect thereto. It is to be understood that like joints 50' are provided between adjacent panels, 48' and 48a'; 48b' and 48c'; 48c' and 48d'; 48d' and 48e', to form each complete sidewall 24' as one of ordinary skill in the art would understand. Moreover, for convenience in explanation, the structure of the panels 48'–48e' is described with respect to panel 48a', with the understanding that the structure of each of the other panels 48', 48b'–48e' is identical in construction. Finally, like reference numerals are used to denote like elements in the second embodiment as in the first embodiment, with a prime following the reference numeral.

Panel 48a' includes a plastic core member 52a' sandwiched between an outer metal skin 54a' and an inner thin metal skin 56a' and bonded thereto by a suitable known adhesive or other like means. The outer skin 54a' and the inner skin 56a' are preferably approximately 0.026 inches thick. The skins 54a', 56a' are preferably made of aluminum, galvanized, full hardened steel, such as AISI Grade E full hard steel because of its cost effectiveness, or the like. Preferably, the outer skin 54a' is made of ASTM G90 galvanized steel and the inner skin 56a' is made of ASTM G60 galvanized steel. Aluminum may be used, but it may be too soft for some purposes and strength and punch resistance are sacrificed, however, aluminum is lightweight. Each core member 52a' is made of some type of compressible non-metal material, preferably thermoplastic, such as polypropylene or high density polyethylene. These materials are relatively inexpensive as compared to aluminum found in prior trailer wall constructions. In addition, because a composite panel 48a' is used, the weight of the trailer construction is reduced over trailers having aluminum sidewalls.

The core member 52a' has a first end 58a' which has an outer portion which slants from the interior of the trailer 20' to the exterior of the trailer 20' at an angle and an inner portion which slants from the interior of the trailer 20' to the exterior of the trailer 20' at an angle, such that the outer portion and the inner portion meet at an apex which protrudes outwardly from the center of the core member 52a'. The second end 60a' of the core member 52a' slants from the interior of the trailer 20' to the exterior of the trailer 20' at an angle.

The inner skin 56a' of the panel 48a' has a plurality of portions which are integrally formed with each other and are roll formed into shape. Specifically, working left to right in FIG. 4, the inner skin 56a' includes a first extending portion 100a which is connected to and integrally formed with a first intermediate end portion 102a which is connected to and integrally formed with an intermediate side portion 104a which is connected to and integrally formed with a second intermediate end portion 106a which is connected to and integrally formed with a second extending portion 108a. The intermediate side portion 104a abuts against and covers the side of the core member 52a'. The first intermediate end portion 102a abuts against and covers the inner angled end portion of the first end 58a' of the core member 52a', and the second intermediate end portion 106a abuts against and covers the angled second end 60a' of the core member 52a'. Thus, each of the intermediate end portions 102a, 106a are angled relative to the intermediate side portion 104a and each of the intermediate end portions 102a, 106a angle outwardly from the center of the core member 52a'. The first extending portion 100a extends outwardly from a position proximate to the apex formed at first end 58a' of the core member 52a' a predetermined distance, preferably approximately one inch, and is parallel to the intermediate side portion 104a and is angled relative to the first intermediate end portion 102a. The second extending portion 108a extends outwardly from the second end 60a' of the core member 52a' a predetermined distance, preferably approximately one inch, and is parallel to the intermediate side portion 104a and is angled relative to the second intermediate end portion 106a.

The outer skin 54a' of the panel 48a' has a plurality of portions which are integrally formed with each other and are roll formed into shape. Specifically, working left to right in FIG. 4, the outer skin 54a' includes a first extending portion 110a which is connected to and integrally formed with an intermediate end portion 112a which is connected to and integrally formed with an intermediate side portion 114a which is connected to and integrally formed with a second extending portion 116a. The intermediate side portion 114a abuts against and covers the side of the core member 52a'. The intermediate end portion 112a abuts against and covers the outer portion of the first end 58a' of the core member 52a'. Thus, the intermediate end portion 112a is angled relative to the intermediate side portion 114a. The first extending portion 116a extends outwardly from a position proximate to the apex formed at the first end 58a' of the core member 52a' a predetermined distance, preferably approximately one inch, and is parallel to the intermediate side portion 114a and is angled relative to the intermediate end portion 112a. Preferably, the first extending portion 110a is offset from the intermediate side portion 114a a distance which is approximately equal to double the thickness of the outer skin 54a'. The second extending portion 116a extends outwardly from the second end 60a' of the core member 52a' a predetermined distance, preferably approximately one inch, and is flush with the intermediate side portion 114a.

The first extending portions 100a, 110a abut against each other along the length thereof. The first extending portion 110a of the outer skin 54a' is slightly longer than the first extending portion 100a of the inner skin 56a' and the end 118a of the first extending portion 120a is bent, by roll forming, around the end 120a of the first extending portion 100a to form a first radiused end 118a. The first extending portions 100a, 110a are preferably bonded together by suitable means, such as adhesive.

The second extending portions 108a, 116a abut against each other along the length thereof. The second extending portion 116a of the outer skin 54a is slightly longer than the second extending portion 108a of the inner skin 56a and the end 120a of the second extending portion 116a is bent, by roll forming, around the end 122a of the second extending portion 108a to form a second radiused end 120a. The second extending portions 108a, 116a are preferably bonded together by suitable means, such as adhesive.

To form the novel joint 50', the second extending portion 108a of panel 48a' is abutted against the first extending portion 110b. A plurality of rivets 88' are provided through the second extending portions 116a, 108a of panel 48a and through the first extending portions 110b, 100b of panel 48b. A plurality of aligned apertures are provided through the second extending portions 116a, 108a and through the first extending portions 110b, 100b to accommodate the rivets 88'. The head 90' of each rivet 88' abuts against the exterior surface of the first extending portion 116a of the panel 48a'. The shank of each rivet 88' is upset and the resulting bloom 92' abuts against the second extending portion 100b of panel 48b'. By providing the doubled extending portions 116a, 108a; 110b, 100b on the exterior of the sidewall 24', reinforcement is provided to the joint 50'.

The second radiused end 120a of panel 48a abuts against the first extending portion 110b and proximate to the first intermediate end portion 112b of panel 48b such that a flush outer surface is provided along the length of intermediate side portion 114a, second extending portion 116a, intermediate side portion 114b, and second extending portion 116b. A generally V-shaped juncture results between second radiused end 120a and intermediate end portion 112b. A sealant 125 is provided along the length of the V-shaped juncture to prevent the entry of moisture into the interior of the trailer 20'. The radiused end 120a provides for a smooth surface on the exterior surface of the trailer 20' to deter an outside object, such as a forklift, from snagging the sidewalls 24'.

To complete the joint 50' of the second embodiment, a generally U-shaped batten or member 126, made of metal, preferably 0.019 steel, is mounted against the inner second end portion 106a of panel 48a' and against first end portion 102b of panel 48b'. The generally U-shaped member 126 has a planar base 128 and opposite legs 130, 132 which depend therefrom. The legs 130, 132 respectively abut against the inner second end portion 106a of panel 48a' and against first end portion 102b of panel 48b'. The base 128 is flush with the intermediate side portions 104a, 104b. The juncture of the base 128 and each leg 130, 132 is radiused to prevent an outside object, such as a forklift from snagging on the junction. The U-shaped member 126 is installed by a mechanical clip (not shown) or by bonding with hot melt or two component adhesive 134. The bloom 92' of each rivet 88' thus sits between the U-shaped member 126 and the first extending portion 100b of panel 48b' and is not exposed to the interior of the trailer 20'.

While preferred embodiments of the present invention are shown and described, it is envisioned that those skilled in the art may devise various modifications of the present invention without departing from the spirit and scope of the appended claims.

The invention claimed is:

1. A joint between a pair of panels adapted for use in a sidewall of a trailer body comprising:

a first panel comprising an inner metal skin, an outer metal skin and a plastic core member sandwiched between said inner skin and said outer skin, said core member having first and second opposite ends, each of said inner skin and said outer skin having a first extending portion thereof which extends beyond said first end of said core member a predetermined distance, said first extending portions laying against each other;

a second panel comprising an inner metal skin, an outer metal skin and a plastic core member sandwiched between said inner skin and said outer skin, said core member having first and second opposite ends, each of said inner skin and said outer skin having a second extending portion thereof which extends beyond said second end of said core member a predetermined distance, said second extending portions laying against each other;

a member provided between said abutted first extending portions and said abutted second extending portions, said member having a thickness which is less than the thickness of said cores of said first and second panels, such that the outer surfaces of said inner skins of said first and second panels are flush, and such that the outer surfaces of said outer skins of said first and second panels are flush; and joining means for joining said panels together along said abutted first extending portions, said member and said abutted second extending portions.

2. A joint as defined in claim 1, wherein said member is made out of metal or plastic.

3. A joint as defined in claim 2, wherein said joining means comprises a plurality of rivets provided through said abutted first extending portions, said abutted second extending portions, and said member.

4. A joint as defined in claim 1, wherein said first extending portion defined by said inner skin of said second panel is flush with a portion of said inner skin of said second panel which abuts said core member of said second panel, and said first extending portion defined by said outer skin of said first panel is flush with a portion of said outer skin of said first panel which abuts said core member of said first panel.

5. A joint as defined in claim 1, wherein said first extending portions are bonded together, and said second extending portions are bonded together.

6. A joint as defined in claim 1, wherein said inner skin which defines said first extending portion sits against said outer skin which defines said second extending portion.

7. A joint as defined in claim 6, wherein said second extending portion defined by said outer skin of said first panel is flush with a portion of said outer skin of said first panel which abuts said core member.

8. A joint between a pair of panels adapted for use in a sidewall of a trailer body comprising:

a first panel comprising an inner metal skin, an outer metal skin and a plastic core member sandwiched between said inner skin and said outer skin, said core member having first and second opposite ends, each of said inner skin and said outer skin having a first extending portion thereof which extends beyond said first end of said core member a predetermined distance, said first extending portions laying against each other;

a second panel comprising an inner metal skin, an outer metal skin and a plastic core member sandwiched between said inner skin and said outer skin, said core member having first and second opposite ends, each of said inner skin and said outer skin having a second extending portion thereof which extends beyond said second end of said core member a predetermined distance, said second extending portions laying against each other; and joining means for joining said panels together along said abutted first extending portions and said abutted second extending portions, wherein in each said panel, an end of said first extending portion of said inner skin is bent around an end of said first extending portion of said outer skin.

9. A joint as defined in claim 8, wherein in each said panel, an end of said second extending portion of said outer skin is bent around an end of said second extending portion of said inner skin.

10. A joint as defined in claim 9, wherein said end of said second extending portion of said outer skin which is bent around an end of said first extending portion of said inner skin of said first panel sits against said outer skin of said second panel to define a juncture and further including a sealant provided along said juncture.

11. A joint between a pair of panels adapted for use in a sidewall of a trailer body comprising:

a first panel comprising an inner metal skin, an outer metal skin and a plastic core member sandwiched between said inner skin and said outer skin, said core member having first and second opposite ends, each of said inner skin and said outer skin having a first extending portion thereof which extends beyond said first end of said core member a predetermined distance, said first extending portions laying against each other;

a second panel comprising an inner metal skin, an outer metal skin and a plastic core member sandwiched between said inner skin and said outer skin, said core member having first and second opposite ends, each of said inner skin and said outer skin having a second extending portion thereof which extends beyond said second end of said core member a predetermined distance, said second extending portions laying against each other; and joining means for joining said panels together along said abutted first extending portions and said abutted second extending portions, wherein in each said panel, an end of said second extending portion of said outer skin is bent around an end of said second extending portion of said inner skin.

12. A joint as defined in claim 11, wherein said end of said second extending portion of said outer skin which is bent around an end of said first extending portion of said inner skin of said first panel sits against said outer skin of said second panel to define a juncture and further including a sealant provided along said juncture.

13. A joint between a pair of panels adapted for use in a sidewall of a trailer body comprising:

a first panel comprising an inner metal skin, an outer metal skin and a plastic core member sandwiched between said inner skin and said outer skin, said core member having first and second opposite ends, each of said inner skin and said outer skin having a first extending portion thereof which extends beyond said first end of said core member a predetermined distance, said first extending portions laying against each other;

a second panel comprising an inner metal skin, an outer metal skin and a plastic core member sandwiched between said inner skin and said outer skin, said core member having first and second opposite ends, each of said inner skin and said outer skin having a second extending portion thereof which extends beyond said second end of said core member a predetermined distance, said second extending portions laying against each other;

said inner skin which defines said first extending portion sitting against said outer skin which defines said second extending portion;

joining means for joining said panels together along said abutted first extending portions and said abutted second extending portions; and a generally U-shaped member proximate to said first extending portion defined by said inner skin of said second panel.

14. A joint as defined in claim 13, wherein said generally U-shaped member has a base and a pair of legs which depend from opposite ends of said base, said base being flush with said inner skins of said first and second panels.

15. A joint as defined in claim 14, wherein the juncture between said base and each said leg is radiused.

16. A joint as defined in claim 14, wherein said generally U-shaped member is metal.

17. A joint as defined in claim 13, wherein said generally U-shaped member is adhered to said first and second panels by adhesive.

18. A joint as defined in claim 13, wherein said generally U-shaped member is mounted to said first and second panels by at least one clip.

19. A joint as defined in claim 13, wherein said joining means comprises a plurality of rivets, each said rivet having a shank provided through said abutted first extending portions and said abutted second extending portions and an end which is between said first extending portion defined by said outer skin and said generally U-shaped member.

20. A joint between a pair of panels adapted for use in a sidewall of a trailer body comprising:

a first panel comprising an inner metal skin, an outer metal skin and a plastic core member sandwiched between said inner skin and said outer skin, said core member having first and second opposite ends, each of said inner skin and said outer skin having a first extending portion thereof which extends beyond said first end of said core member a predetermined distance, said first extending portions laying against each other;

a second panel comprising an inner metal skin, an outer metal skin and a plastic core member sandwiched between said inner skin and said outer skin, said core member having first and second opposite ends, each of said inner skin and said outer skin having a second extending portion thereof which extends beyond said second end of said core member a predetermined distance, said second extending portions laying against each other;

said inner skin which defines said first extending portion sitting against said outer skin which defines said second extending portion;

a member abutting against said first extending portion defined by said inner skin of said second panel, said member having an outer surface which is flush with the outer surfaces of said inner skins of said first and second panels; and joining means for joining said abutted first extending portions, said member and said abutted second extending portions together.

* * * * *